United States Patent
Patterson

(10) Patent No.: US 10,946,790 B1
(45) Date of Patent: Mar. 16, 2021

(54) AUXILIARY LIGHTING CONTROL FOR VEHICLES AND TRAILERS

(71) Applicant: Dye-it Fuel Marking Inc., Prince George (CA)

(72) Inventor: Bruce Patterson, Prince George (CA)

(73) Assignee: Dye-it Fuel Marking, Prince George (CA)

( * ) Notice: Subject to any disclaimer, the term of this patent is extended or adjusted under 35 U.S.C. 154(b) by 0 days.

(21) Appl. No.: 17/070,515

(22) Filed: Oct. 14, 2020

Related U.S. Application Data

(60) Provisional application No. 62/969,414, filed on Feb. 3, 2020.

(51) Int. Cl.
| | |
|---|---|
| *B60Q 1/14* | (2006.01) |
| *B60Q 1/22* | (2006.01) |
| *B60Q 1/30* | (2006.01) |
| *B62D 63/08* | (2006.01) |
| *H05B 47/14* | (2020.01) |

(52) U.S. Cl.
CPC .......... *B60Q 1/1461* (2013.01); *B60Q 1/22* (2013.01); *B60Q 1/30* (2013.01); *B62D 63/08* (2013.01); *H05B 47/14* (2020.01); *B60Q 2300/052* (2013.01)

(58) Field of Classification Search
CPC .......... B60Q 1/1461; B60Q 1/22; B60Q 1/30; B60Q 2300/052; H05B 47/14; B62D 63/08
See application file for complete search history.

(56) References Cited

U.S. PATENT DOCUMENTS

| | | | | |
|---|---|---|---|---|
| 4,321,507 A | * | 3/1982 | Bosnak | H05B 41/30 315/200 A |
| 6,153,981 A | * | 11/2000 | Thomas | H05B 41/34 315/200 A |

OTHER PUBLICATIONS

Marcel, "On-Off Switch circuit using a 555 time", 2015, Electronics Area, pp. 1-6, https://electronicsarea.com/on-off-switch-circuit-using-555-timer/ (Year: 2015).*

* cited by examiner

*Primary Examiner* — Daniel D Chang
(74) *Attorney, Agent, or Firm* — Kyle R Satterthwaite; Michael R Williams; Ade & Company Inc.

(57) ABSTRACT

A control device for a first lighting load on a vehicle or trailer features an input connected to a lighting circuit through which a different second lighting load is operated, thus placing the controller in parallel relation with the lighting circuit, and a power output connected to the first lighting load on the vehicle or trailer. The controller is configured to detect from the input, a signal change sequence in the lighting circuit that comprises an initial high-to-low signal downstep, and a subsequent low-to-high signal upstep completed within a limited time window triggered by the initial high-to-low signal downstep. In response to detection of this signal change sequence, the controller energizes the first lighting load. If the second lighting load is the vehicle headlights, for example, a user can turn on the first lighting load by momentarily flipping the headlight switch off, and then quickly back on again.

22 Claims, 4 Drawing Sheets

AUXILIARY LIGHTING CONTROL FOR VEHICLES AND TRAILERS

CROSS-REFERENCE TO RELATED APPLICATIONS

This application claims benefit under 35 U.S.C. 119(e) of U.S. Provisional Application No. 62/969,414, filed Feb. 3, 2020, the entirety of which is incorporated herein by reference.

FIELD OF THE INVENTION

The present invention relates generally to vehicle lighting, and more particularly to devices and methods for controlling activation of auxiliary vehicle lighting, such as back-up lighting on tractor-trailers, work lights on flat-bed trailers, and auxiliary drive lights for off-road, construction and emergency vehicles and other applications requiring more illumination than afforded by standard vehicle lighting.

BACKGROUND

It is known in the art to add auxiliary lighting to vehicles and trailers, for example back-up lights or turning lights installed on the rear or side of the trailer of a highway tractor to improve driver visibility when turning and reversing such large-scale vehicles at night or in other situations of reduced visibility. Imparting control over such auxiliary lights, and other auxiliary equipment such as back-up alarms, using existing componentry of the vehicle as input signals for such control has also been previously proposed, for example including activation of the auxiliary equipment by detected shifting of a vehicle into reverse gear, or detected activation of the vehicle's turn signals, either alone or in combination with the vehicle's taillights. Such solutions avoid the need to install separate manually-operated switches in the vehicle cabin.

However, in at least many instances, this will mean that every time such original existing componentry of the vehicle is used, the auxiliary equipment will be automatically activated, rather than leaving activation of the auxiliary equipment to the vehicle operator's discretion. It would be desirable to allow such operator discretion for selective activation of the auxiliary equipment only when necessary or appropriate, for example so as not to blind others nearby with bright auxiliary lights when such additional lighting is not needed by the vehicle operator.

U.S. Pat. No. 7,137,674 assigned to Bendix Commercial Vehicle Systems LLC deviates from other prior art by using a particular sequence of signal pulses in a brake light circuit as an activation signal for an auxiliary back-up light or back-up alarm, whereby the auxiliary equipment is only activated if the vehicle operator taps the brake pedal a predetermined number of times within a predetermined window of time. This gives the vehicle operator discretionary control, but since intermittent operation of the brake pedal may be a matter of necessity during some vehicle reversal situations, this could possibly result in unintentional activation of the auxiliary equipment. Additionally, the prior patent relies on a specially programmed ECU to carry out the described control routines, thus requiring replacement, reprogramming or duplication of the trailer's existing ECU when it comes to aftermarket installation scenarios.

Accordingly, there remains room for improvements and alternatives for control of auxiliary vehicle lighting.

SUMMARY OF THE INVENTION

According to a first aspect of the invention, there is provided a lighting control device for control of a first lighting load on a vehicle, or on a trailer towed thereby, said device comprising:
　a controller comprising:
　an input electrically connected or connectable to a lighting circuit of the vehicle or trailer through which a different second lighting load on the vehicle or trailer is operated to place said controller in parallel relation with said lighting circuit; and
　a power output electrically connected or connectable to the first lighting load on the vehicle or trailer;
　the controller being configured to:
　detect from the input, a signal change sequence in the lighting circuit that comprises an initial high-to-low signal downstep, and a subsequent low-to-high signal upstep completed within a limited time window triggered by the initial high-to-low signal downstep;
　in response to detection of said signal change sequence, energize the first lighting load via said power output.

According to a second aspect of the invention, there is provided a vehicle lighting control device for control of a first lighting load on a vehicle, or on a trailer towed thereby, said device comprising:
　an integrated circuit (IC) chip comprising:
　a power pin connected or connectable to, in parallel relation with, a lighting circuit through which a different second lighting load on the vehicle or trailer is operated;
　a trigger pin connected or connectable with the lighting circuit in parallel relation therewith; and
　an output pin that is energized in response to dropping of a signal level at the trigger pin from a high to low state;
　a solid-state switch having a gate connected to the output pin of the IC chip, a cathode connected or connectable the first lighting load, and an anode connected or connectable to the lighting circuit in parallel relation therewith; and
　at least one capacitor connected to the power pin of the IC chip, and connected or connectable to the lighting circuit in parallel relation therewith, to accumulate stored energy during a high signal state of the lighting circuit, and to discharge said stored energy to the power pin of the IC chip when the lighting circuit drops to a low signal state.

According to a third aspect of the invention, there is provided a method of controlling a first lighting load on a vehicle, or on a trailer towed thereby, said method comprising:
　monitoring a lighting circuit through which a different second lighting load on the vehicle or trailer is operated;
　detecting a signal change sequence in said lighting circuit that comprises an initial high-to-low signal downstep, and a subsequent low-to-high signal upstep completed within a limited time window triggered by the initial high-to-low signal downstep; and
　in response to detection of said signal change sequence, energize the first lighting load.

According to a fourth aspect of the invention, there is provided a method of controlling a first lighting load on a vehicle, or on a trailer towed thereby, said method comprising:
　monitoring for a particular sequence of signal changes in a lighting circuit through which a different second lighting load on the vehicle or trailer is operated; and in response to detected completion of said particular sequence, within a limited time duration measured from a start of said sequence, energizing the first lighting load on said vehicle or trailer;
  wherein said lighting circuit is selected from among:
    a headlight/taillight circuit of the vehicle or trailer, in which the sequence of signal changes results from operator manipulation of a headlight control switch of the vehicle;
    a high-beam headlight circuit of the vehicle, in which the sequence of signal changes results from operator manipulation of a headlight dimmer switch of the vehicle; and
    a clearance/side-marker lighting circuit of the vehicle or trailer, in which the sequence of signal changes results from operator manipulation of a clearance/side-marker lighting control switch of the vehicle.

BRIEF DESCRIPTION OF THE DRAWINGS

One embodiment of the invention will now be described in conjunction with the accompanying drawings in which.

DETAILED DESCRIPTION

Figure 1:
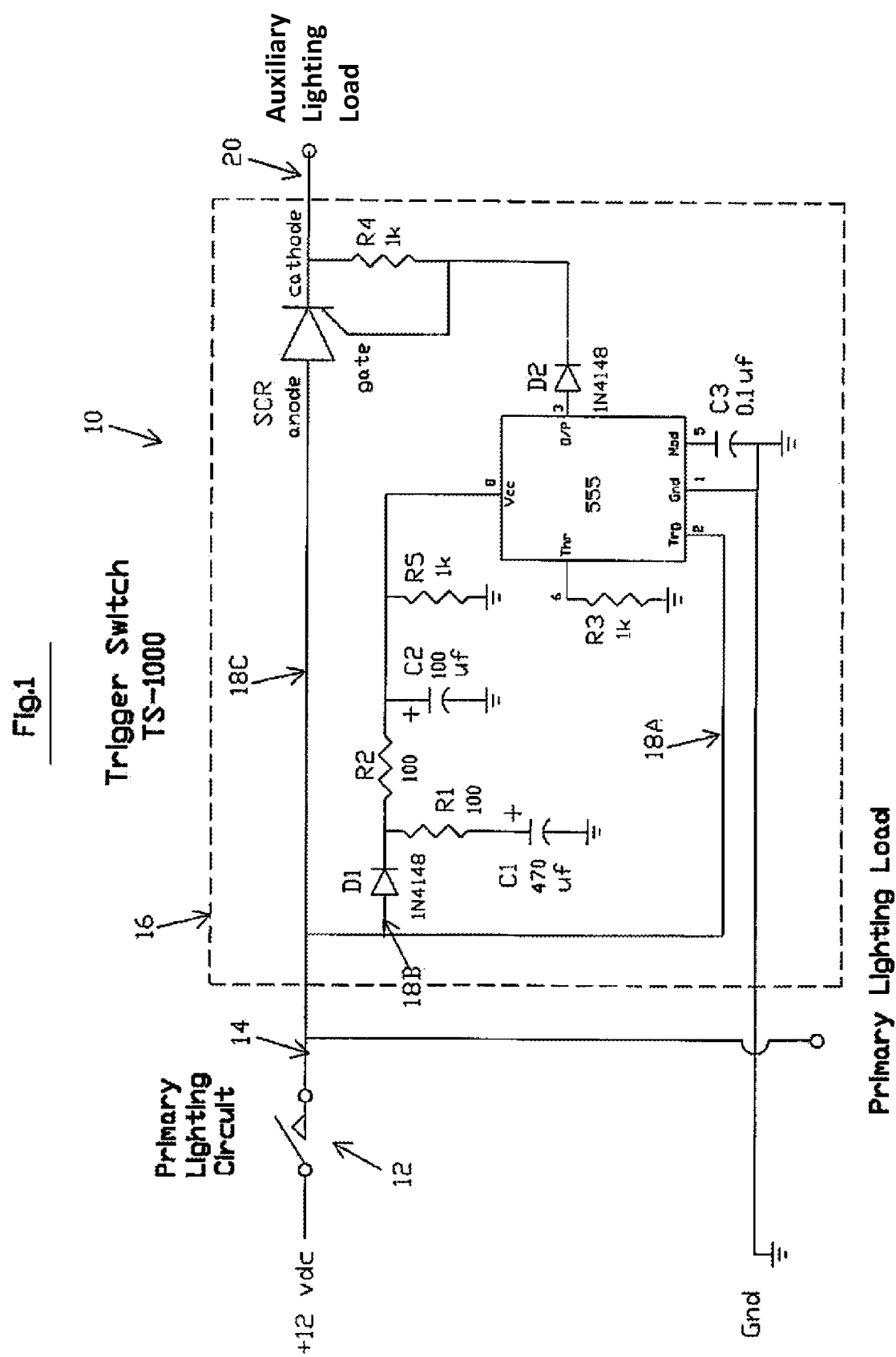
FIG. 1 is a schematic circuit diagram illustrating use of an auxiliary lighting control device of the present invention to control an auxiliary lighting load on a vehicle or trailer.

FIG. 1 is a schematic circuit diagram showing an auxiliary lighting control device 10 of the present invention installed in parallel with a primary lighting circuit of a vehicle, or of a trailer towed thereby, for the purpose of triggering illumination of an auxiliary lighting load of the vehicle or trailer in response to detected signal changes in the primary lighting circuit. Accordingly, through manipulation of existing factory-installed primary lighting controls (e.g. headlight control switch, high-beam dimmer switch, clearance/side-marker lighting control switch) found in the operator cabin of the vehicle, the vehicle operator can perform a particular trigger sequence for activating the auxiliary lighting load.

In one implementation, the auxiliary lighting load comprises one or more rear back-up lights installed on the rear end of a towed trailer, in which case the factory-installed primary lighting control may be, for example, a headlight control switch of the vehicle, through which both a headlight circuit of the vehicle and taillight circuits of the vehicle and trailer are switchable between "on" and "off" states to turn the vehicle and trailer taillights on and off.

In another implementation, the auxiliary lighting load comprises one or more work lights installed on the vehicle or trailer, for example one or more work lights installed on one or both sides of a flatbed trailer that has tie-down loops, tie-down rings, load strap ratchets, or other load securing equipment installed thereon and illuminated by appropriate positioning of the work lights. In such instance, the primary lighting control may be, for example, a clearance/side-marker lighting control switch of the vehicle, through which a clearance/side-marker lighting circuit of the trailer is switchable between "on" and "off" states to turn the clearance lights and/or side-marker lights of the trailer on and off.

In yet another implementation, the auxiliary lighting load comprises one or more auxiliary drive lights on the vehicle that are used to augment the primary headlights thereof during night driving and other low visibility situations, particularly for trucks, off-road vehicles, emergency vehicles, construction vehicles, etc. In such instance, the primary lighting control may be, for example, a headlight dimmer switch of the vehicle, through which the primary headlights of the vehicle are switched between high-beam and low-beam operation.

These three particular implementations are intended purely as non-limiting examples, and the particular type of primary lighting circuit and associated control, and particular type of auxiliary lighting to be triggered by unique control signal sequences in that primary circuit, may be varied and combined in any fashion without departure from the scope of the present invention.

Referring to FIG. 1, the primary lighting circuit may be of conventional design, and in the illustrated example features a primary lighting control switch 12 (e.g. headlight control switch, clearance/side-marker lighting control switch, or headlight dimmer switch) installed between the vehicle's power supply and the primary lighting load (e.g. vehicle headlights and taillights, and trailer taillights if connected; or trailer/vehicle clearance/side-marker lights). The primary lighting control switch 12 is actuable by the vehicle operable to switch the primary lighting load between "high" and "low" states (e.g. "on" and "off" states of the headlights and taillights; "on" and "off" states of the clearance lights and/or side-marker lights; or "high-beam" and "low-beam" states of the headlights).

The auxiliary lighting control device 10 of the present invention, also referred to herein as a "trigger switch" in the interest of brevity, features an input lead wire 14 spliced into connection with the primary lighting circuit at a location between the primary lighting control switch 12 and the primary lighting load, whereby the trigger switch 10 is connected to the primary lighting load in parallel relation thereto so that both the trigger switch 10 and the primary lighting load receive power when the primary lighting control switch 12 is closed. In the implementation where the primary lighting control switch 12 is the headlight dimmer switch of the vehicle, and the auxiliary lighting load is one or more auxiliary drive lights, the input lead wire 14 is spliced into the high-beam headlight circuit, not the low-beam headlight circuit, so that the trigger switch 10 is energized only when the headlight dimmer switch 12 is placed in the high-beam position to energize the high-beam headlight circuit.

In the illustrated embodiment, the trigger switch 10 is a stand-alone device separate from the auxiliary lighting load, and therefore has its own dedicated housing 16 in which there is housed, and preferably potted or encapsulated, a printed circuit board (PCB) that carries the electronic componentry of the trigger switch 10. The illustrated embodiment is thus representative of aftermarket applications, where the trigger switch and any separate auxiliary light can be incorporated into the lighting system of an existing vehicle or trailer together. In other embodiments, the trigger switch 10 may be incorporated into the housing of an aftermarket auxiliary light itself, or into the lighting system of the vehicle or trailer during factory construction thereof. From its connection to the primary lighting circuit, the input lead wire 14 passes into the housing 16 and feeds three conductive input traces 18A, 18B, 18C on the PCB. Of these, a signal input trace 18A leads to a trigger pin 2 of a 555 integrated circuit (IC) timer chip, a power input trace 18B leads to the anode of a protective diode D1, and a power output trace 18C leads to the anode of a silicon controller rectifier (SCR) or other electronically controlled solid-state switch, which when placed in a conductive state, enables powering of the auxiliary lighting load from the primary lighting circuit via an output lead 20 connected to the cathode side of the solid-state switch SCR.

Additional conductive traces from the cathode side of the protective diode D1 conductively connect the protective diode D1 to the power pin 8 of the 555 IC timer, and also connect the power pin of the 555 IC timer to ground via two energy storage capacitors C1, C2 that are connected in parallel to one another between the protective diode D1 and the timer's power pin 8. A respective resistor R1, R2 is connected in series between each capacitor C1, C2 and the protective diode D1, and another resistor R5 may be connected between the power pin 8 of the 555 IC timer and ground at a point between the power pin 8 and the storage capacitors C1, C2. A threshold pin 6 of the 555 IC timer is connected to ground via another resistor R3.

An output pin 3 of the 555 IC timer is connected to the anode side of another protective diode D2. The cathode side of this diode D2 is connected to a gate of the solid-state switch SCR, and also to the output lead 20 on the cathode side of the solid-state switch SCR via another resistor R4 placed in parallel relation to the gate of the solid-state switch SCR. The ground pin 1 of the 555 IC timer is connected to ground, in parallel to a decoupling capacitor C3 that is connected to a control pin 5 of the 555 IC timer as a filter to prevent erroneous noise to the 555 IC timer. Pin 5 is otherwise unused in the illustrated application, as is the timer's reset pin (which is therefore not shown in the diagrams). Discharge pin 7 of the 555 IC timer is unused in FIG. 1, and therefore also omitted, through the variant of FIG. 3 makes use of the discharge pin 7, as described in more detail further below.

Having described the control circuitry of the trigger switch 10, attention is now turned to its operation. When the primary lighting circuit is energized to its high state by closure of the primary control switch 12, thus sending a high "ON" signal to the primary lighting load to cause active illumination thereof, the trigger switch 10 also enters a "high" or charged state. The trigger pin 2 of the 555 IC timer receives instantaneous voltage from the primary lighting circuit as a result of its direct connection thereto by the input lead wire 14 and signal input trace 18A, whereas the application of voltage to the power pin 8 of the 555 IC timer is instead subject to a slight delay due to the capacitors and resistors connected to the power pin 8. This ensures that trigger pin 2 receives a "high" signal before the 555 IC timer is energized at power pin 8. So long as a trigger pin 2 has a high status, trigger pin 3 remains low. By ensuring trigger pin 2 receives the high signal from the primary lighting circuit before power pin 8, output pin 3 will never be triggered high when the 555 IC timer is first powered up at pin 8. The storage capacitors C1 and C2 are charged by their connection to the vehicle's power supply via the closed primary control switch 12.

When the primary control switch 12 is opened, thus switching the primary lighting circuit into a "low" signal state, trigger pin 2 likewise goes low, by going to ground through the primary lighting circuit. Meanwhile, though the primary lighting circuit has gone low, the 555 IC timer continues to be powered by the stored energy accumulated in the capacitors C1 and C2, as such energy cannot be discharged back to the primary lighting circuit due to the protective diode D1 that prevents such backflow. So, with the 555 IC timer still in an energized state, but with trigger pin 2 having gone low, the 555 IC timer triggers energization of output pin 3 to its high state, which will remain latched in this high state so long as the 555 IC timer continues to receive power from the storage capacitors C1 and C2 at the power pin 8. This high state of output pin 3 thus sends a gate signal to the gate of the solid-state switch SCR, which therefore switches from a normally non-conductive state into a conductive state allowing current flow between its anode and cathode. Initially however, no such current flow will occur, due to the presently "low" signal state of the primary lighting circuit. Resistor R4 is included to allow the voltage of the gate to remain 0.3V above the voltage of the cathode, as required for proper operation of solid-state switch SCR.

If the control switch 12 is reclosed before the storage capacitors C1 and C2 are fully discharged and the 555 IC timer loses power, then output pin 3 of the 555 IC timer remains latched at a high state, thus maintaining the solid-state switch SCR in its conductive state. Accordingly, this return of the primary lighting circuit to its high signal status by the reclosing of the control switch 12 begins the flow of the current from the primary lighting circuit through the solid-state switch SCR to the auxiliary lighting load, thus energizing and illuminating same.

So, at night time, or during any other low-visibility situation where a vehicle operator may require auxiliary light, the vehicle operator would normally already have the primary lighting circuit in its high state. Using the example of an auxiliary back-up light installed at the rear of a trailer to better illuminate the reverse travel path of the trailer in the dark, the vehicle operator will inherently already have their headlight control switch 12 set to "ON" to energize the headlights of the vehicle, which inherently also energizes the taillights of both the vehicle and the trailer, provided the electrical connectors between the vehicle and trailer are properly connected. In order to activate the auxiliary back-up light, the vehicle operator performs a two-step switching sequence on the headlight control switch, first moving it from its "ON" position to its "OFF" position, and then quickly back into its "ON" position. In the trailer's taillight circuit, this causes a momentary signal change sequence composed of an initial downstep dropping the taillight circuit signal from its originally "high" state down to a momentary "low" state, and followed by a subsequent upstep raising the taillight circuit signal back up to its "high" state. In in the interest of brevity, this sequence is referred to herein as a "high-low-high" signal change sequence. The initial downstep causes the 555 IC timer to rely on the storage capacitors C1 and C2 for power, but as long as the subsequent upstep is performed before the storage capacitors have fully discharged, the auxiliary lighting will be activated, and maintained in an energized state until the headlight control switch 12 is turned off, and left off long enough that the capacitors fully discharge and the 555 IC timer loses power.

If after the initial downstep of the high-low-high signal change sequence, the primary lighting circuit is not returned to its "high" signal state before the storage capacitors C1 and C2 are fully discharged, then the 555 IC timer losses power, and the latched "high" state of the output pin 3 is nullified. The gate signal to the solid-state switch SCR is thus terminated, returning the solid-state switch SCR to its default non-conductive state. Accordingly, even if the primary lighting circuit is subsequently returned to its high status, the 555

IC timer will not trigger output pin 3 to go high, and therefore will not reapply the gate signal to the solid-state switch SCR, which therefore cannot conduct current to the auxiliary lighting. Therefore, only the primary lighting load will be reactivated.

Figure 2:
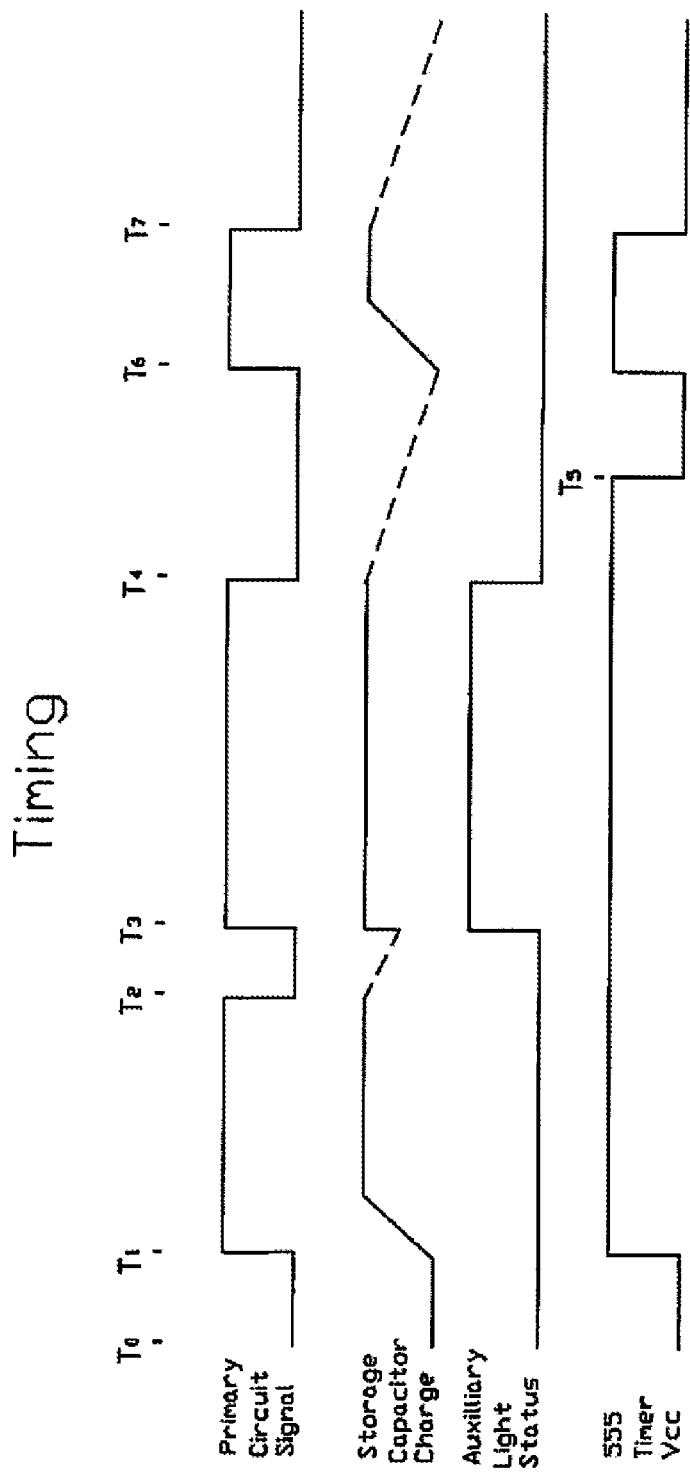
FIG. 2 graphically illustrates relative timing of inputted and outputted controls signals and powered operation of the control device and auxiliary lighting based on same.

An example of the signal timing is shown in FIG. 2, and is described in the context where the auxiliary light is a rear back-up light on a trailer, and is controlled based on input signals from the taillight circuit of the trailer, as governed by the headlight control switch in the operator cabin of the vehicle. Such implementation may be carried out by installing the back-up light at the rear of the trailer with the output lead wire 20 connected to the back-up light, and splicing or otherwise connecting the input lead wire 14 of the trigger switch 10 to the taillight circuit of the trailer at or near one of the standard taillights also at the rear end of the trailer.

At time t0, all circuits and trigger switch components are inactive, for example as would the case before the vehicle operator has started the vehicle and turned their headlight control switch 12 into the "ON" position to initiate a "high" signal state in the headlight and taillight circuits. At time t1, the vehicle operator switches the headlight control switch 12 from "OFF" to "ON", thereby switching the headlight and taillight circuits of the vehicle and trailer to a "high" signal state, which initiates charging of the storage capacitors C1, C2 and powering up of the 555 IC timer, but does not yet activate the auxiliary back-up light. At time t2, the vehicle operator momentarily flips the headlight control switch 12 to the "OFF" position, and then quickly flips it back into the "ON" position at time t3 before the storage capacitors C1, C2 are depleted and 555 IC timer loses power. This triggers the "high" state at the output pin 3 of the 555 IC timer, and thereby switches the solid-state switch SCR into its conductive state to energize the auxiliary back-up light. Timespan t2-t3 thus denotes a high-low-high signal change sequence in the primary lighting circuit that triggers activation of the auxiliary lighting load.

At t4, when use of the back-up light is no longer required, the vehicle operator again flips the headlight control switch 12 to the "OFF" position, thereby switching off the headlights, taillights and auxiliary light; but does not immediately flip it back to the "ON" position as they did at time t3. Instead, the vehicle operator leaves the headlight control switch in the "OFF" position for a duration of time exceeding the window of time that it takes the storage capacitors C1, C2 to dissipate their stored energy. So, at time t5, with the headlight control switch 12 still "OFF", the storage capacitors C1, C2 are depleted to a level no longer sufficient to provide the timer's necessary operating voltage, thus causing the 555 IC timer to lose power. Only after time t5 does the vehicle operator then flip the headlight control switch back "ON" at time t6, thus returning the headlight and taillight circuits of the vehicle and trailer to their "high" signal state to re-activate the vehicle headlights and the vehicle and trailer taillights. Timespan t4-t5 thus represents a predetermined period of time that it takes for the 555 IC timer to deactivate due to depletion of storage capacitors. It within this window of time that the vehicle operator must switch the primary lighting circuit back into its "high" signal state if they wish to trigger or maintain the "high" status of the timer's output pin 3 to initiate or maintain illumination of the auxiliary lighting load. In the illustrated scenario, where the second high-low-high signal change sequence denoted by timespan t4-t6 has a duration exceeding the predetermined window t4-t5, the 555 IC timer is reactivated at t6 when the headlight control switch is flipped back "ON", but the auxiliary back-up light remains "OFF". When the headlights are turned "OFF" again at t7, the storage capacitors C1, C2 will again discharge, causing shutdown of the 555 IC timer until the next time the headlights are next turned back "ON".

The selected capacitance and resistance of the storage capacitors C1, C2 and the associated resistors R1, R2, R5 connected between the timer's power pin and the protective diode D1 will determine the duration of the countdown window t4-t5 that is initiated by the initial downstep of the high-low-high sequence, and within which the vehicle operator must perform the subsequent up step of the high-low-high sequence to maintain or initiate a high signal status in the auxiliary lighting circuit to trigger or maintain illumination of the auxiliary lighting load. It will therefore be appreciated that the particular capacitance and resistance values shown in the accompanying schematic, and the particular use of two parallel capacitors instead a singular capacitor, are not intended to be limiting on the scope of the present invention, as the selection of different resistance and capacitance can be used to achieve a countdown window of desirable duration. In some embodiments, the countdown window is preferably no less than 0.5 seconds, preferably less than 5 seconds, and more preferably between 1.0 and 3.5 seconds. Like the capacitors and resistors, all other componentry specifications labelled in the drawing or described elsewhere herein are presented purely in a non-limiting context.

Figure 4:
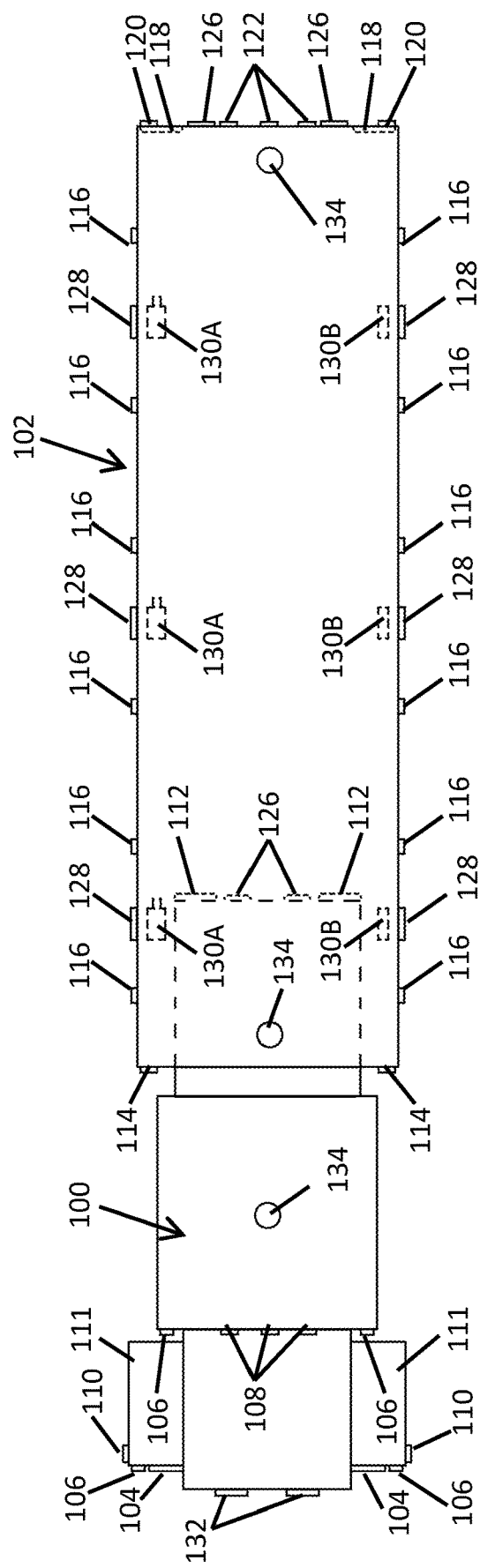
FIG. 4 is a schematic overhead view of a towing vehicle and connected trailer, illustrating various auxiliary lighting loads that can optionally be controlled using the device of FIG. 1 or 3.

The function of the trigger switch 10 when used to control other types of auxiliary lighting is the same as that described for the auxiliary back-up light, whether also controlled by the taillight circuit of the vehicle or trailer, or by another primary lighting circuit of the vehicle or trailer. FIG. 4 illustrates a vehicle and trailer combination, for example a semi trailer tractor 100 composed of a tractor truck 102 that tows a connected trailer 104. The trailer may be of any variety, including a box trailer with an enclosed cargo space, a flatbed trailer with an open cargo deck, a belly dump or other dry bulk trailer, a tanker for liquid cargo, or a car carrier for transporting a plurality of cars thereon.

Primary lighting on the vehicle 100 may include front headlights 104 facing forwardly from the front end of the vehicle, front clearance lights 106 facing forwardly from the front of the vehicle at laterally outermost extents thereof, front identification lights 108 facing forwardly from the front end of the vehicle at an uppermost extent thereof and at a central location thereacross, front side marker lights 110 facing laterally outward from the vehicle at the laterally outer extents thereof and near the front end thereof (e.g. at the front wheel fenders 111), and vehicle taillights 112 at the rear end of the vehicle 100. Primary lighting on the trailer may include front clearance lights 114 facing forwardly from the front end of the trailer at laterally outermost extents thereof, side marker lights 116 facing laterally outward from the vehicle at the lateral sides thereof at regularly spaced intervals between the front and rear ends of the trailer, trailer taillights 118 at the rear end of the trailer 102 at a lower region thereof roughly corresponding to a deck, floor or wheel height of the trailer, rear clearance lights 120 facing rearwardly from the rear end of the trailer at laterally outermost extents thereof at or near a top of the trailer, and rear identification lights 122 facing rearwardly from the rear end of the trailer at an uppermost extent thereof and at a central position thereacross.

The trigger switch 10 may be wired into any of the lighting control circuits responsible for operation of any one or more of these primary lighting loads of the vehicle 100 or trailer 102, and may be used for the purpose of controlling any variety of auxiliary lighting. For example, as described above, one or more auxiliary back-up lights 126 may be installed at the rear end of the trailer 102, and/or at the rear end of the vehicle 100, and be connected to the output lead wire 20 of a trigger switch 10 whose input lead wire 14 is spliced into the headlight/taillight circuit of the vehicle or trailer, for example at a splice location at or near one of the vehicle's or trailer's taillights 112, 118.

Additionally, or alternatively, an auxiliary work light 128 may be installed on a lateral side of the trailer 102, for example proximate a tie-down ring, tie-down loop, load strap ratchet 130A, load strap hooking point 1306 or other load securement feature on the same side of the trailer to illuminate such securement feature for easier operation in the dark. In such instance, the input lead wire 14 may be spliced or otherwise connected into the clearance/side-marker lighting circuit of the trailer responsible for powering of the front and rear clearance, side marker and rear identification lights. For example, the input lead wire 14 may be spliced into this circuit at or near one of the side marker lights 116 on the same side of the trailer 102 at which the work light 128 is being installed and connected to the output lead wire 20. Alternatively, the input lead wire 14 may be spliced into the clearance/side-marker lighting circuit of the trailer at or near a front or rear clearance light 114, 120 residing adjacent to that side of the trailer 102 at the front or rear end of the trailer. One or more such work lights 128 may be similarly installed elsewhere on a vehicle 100 or trailer 102 in similar fashion, and connected to any primary lighting circuit of the vehicle or trailer.

Additionally, or alternatively, one or more auxiliary drive lights 132 may be installed on the vehicle 100 itself, for example at or near the front grille or front bumper of the vehicle 100 or atop the operator cabin thereof, in which case the input lead wire 14 may be spliced or otherwise connected into the high-beam headlight circuit of the vehicle 100 at or near one of the vehicle's front headlights 104. In another example, the auxiliary lighting load may comprise a strobe or rotating beacon light mounted atop the vehicle or trailer 134. These are merely non-limiting examples of where the inventive trigger switch and its executed control methodology may be used. As mentioned above, instead of a separate housing and an output lead wire 20 for connection to a separate auxiliary light, the trigger switch 10 may be incorporated into the housing of the auxiliary light itself.

Figure 3:
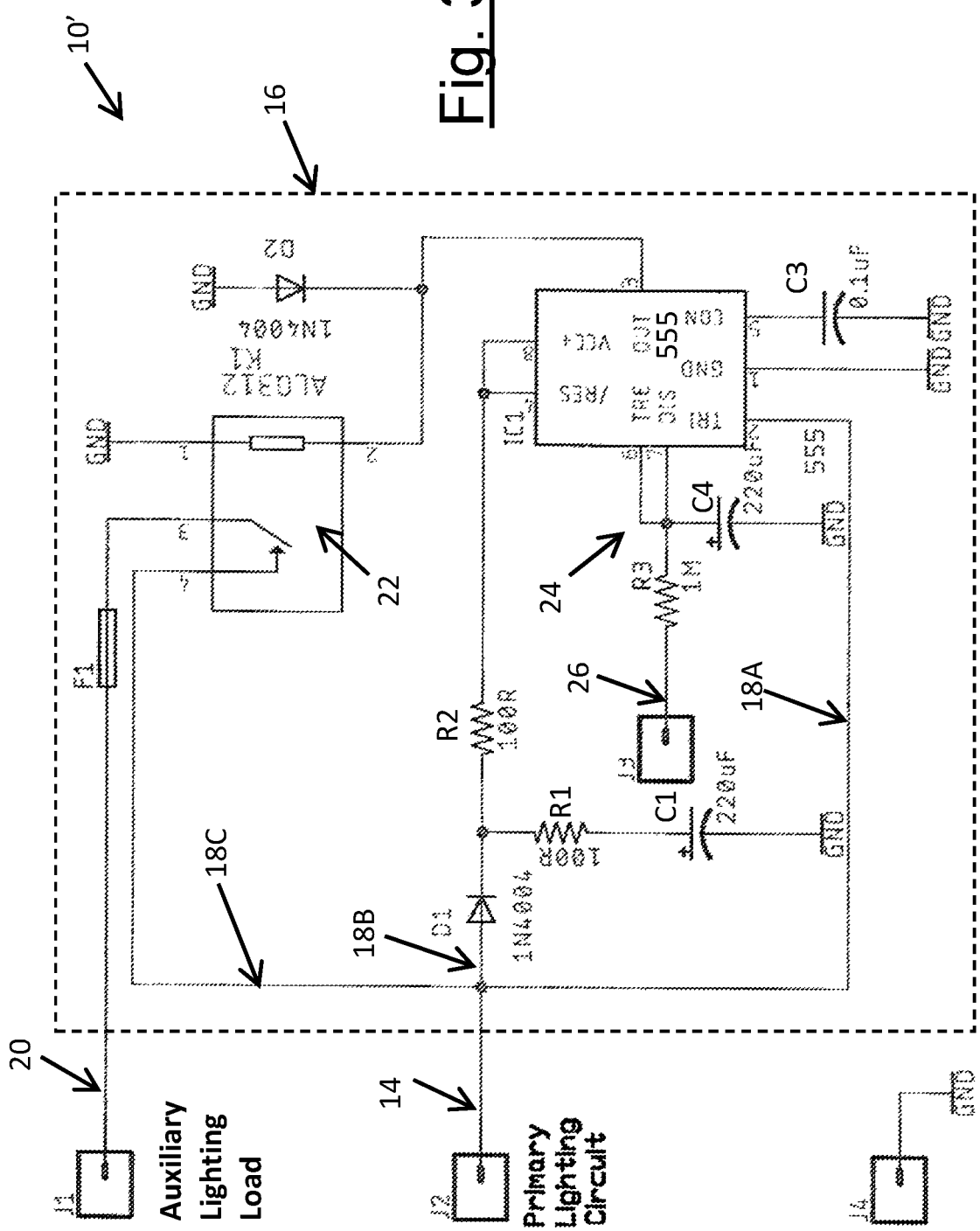
FIG. 3 is a schematic circuit diagram illustrating a variant of the auxiliary lighting control device of FIG. 1.

FIG. 3 shows a variant of the trigger switch 10', which differs from that shown in FIG. 1 primarily in that a normally-open relay 22 is used instead of a solid-state switch SCR to perform energization of the auxiliary lighting load, and in that a timing circuit 24 replaces the simple grounding of threshold pin 6 through resistor R3 in the earlier FIG. 1 example. In this timing circuit 24, the discharge pin 7 of the 555 IC timer is connectable to a supply voltage through resistor R3 via an extra lead wire 26 that is connectable, for example, to the same primary lighting circuit as the input lead wire 14 in order to derive the timing circuit's supply voltage therefrom. The discharge pin 7 is also connected to ground through a timing capacitor C4. Pin 6 is connected between the timing capacity C4 and timing resistor R3 in order to monitor voltage across the timing capacitor C4. When this voltage across the timing capacitor or rises above the threshold value, the output pin 3 of the 555 IC timer goes from high to low, and the timing capacitor is discharged through discharge pin 7. Since the FIG. 3 variant uses a relay, protective diode D2 is instead installed as a flyback diode connected to the output pin 3 of the 555 IC timer in parallel relation to the relay's inductance coil 22A that is likewise connected to the output pin 3.

If the timing circuit is rendered operational by connection of the extra lead wire 26 to a supply voltage during installation of the trigger switch 10', then this timing circuit serves to automatically shut off the auxiliary lighting load after a predetermined shutdown delay, the duration of which is determined by the resistance of the timing resistor R3 and the capacitance of the timing capacitor C4. This way, for example, in the context of a headlight-controlled auxiliary back-up light, if the vehicle operator turns on the auxiliary back up light, and forgets to subsequently shut off the auxiliary back up light by turning the headlight switch off for a long enough period exceeding the countdown window, the auxiliary back-up light will eventually be shut off automatically by the timing circuit. The installer can decide whether or not to wire the timing circuit to the vehicle's power supply during installation, for example depending whether such automatic shutdown is mandated by the requirements of applicable transport regulations in the jurisdiction(s) where the vehicle is intended to be driven.

While the illustrated trigger switches employ a basic 555 IC timer and cooperating discrete circuit componentry to form a controller for sensing the signal status in the primary lighting circuit and monitoring same for the high-low-high signal change sequence, it will be appreciated that the same or similar control routine may alternatively achieved by way of a programmed ECU of the vehicle or trailer or a dedicated microcontroller, though the illustrated embodiment may be considered advantageous, particularly from an aftermarket perspective, where simple, low-cost aftermarket installation is enabled with no reprogramming or redundancy of ECUs.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A lighting control device for control of a first lighting load on a vehicle, or on a trailer towed thereby, said device comprising:
   a controller comprising:
      an input electrically connected or connectable to a lighting circuit of the vehicle or trailer through which a different second lighting load on the vehicle or trailer is operated to place said controller in parallel relation with said lighting circuit;
      a power output electrically connected or connectable to the first lighting load on the vehicle or trailer;
      an integrated circuit (IC) chip comprising a power pin connected to the input for powering of the IC chip from the lighting circuit, a trigger pin connected to the input to receive high and low signals from the lighting circuit, and an output pin that is energized in response to dropping of a signal level at the trigger pin from a high to low state;
      a solid-state switch or relay connected to the output pin of the IC chip and operable to switch into a conductive state energizing the first lighting load upon energization of said output pin of the IC chip; and
      at least one storage capacitor connected to the power pin of the IC chip and to the input so as to accumulate stored energy during a high signal state of the lighting circuit, and to discharge said stored energy to the power pin of the IC chip when the lighting circuit drops to a low signal state;
   the controller being configured to:

detect from the input, a signal change sequence in the lighting circuit that comprises an initial high-to-low signal downstep, and a subsequent low-to-high signal upstep completed within a limited time window triggered by the initial high-to-low signal downstep;

in response to detection of said signal change sequence, energize the first lighting load via said power output.

2. The device of claim 1 in an installed condition in which the power output is electrically connected to the first lighting load, and in which the trigger pin of the IC chip and said at least one capacitor are each connected to the lighting circuit by the input.

3. The device of claim 2 wherein the lighting circuit is a headlight/taillight circuit of the vehicle or trailer, which is wired to a headlight control switch of the vehicle that is manipulatable by a vehicle operator to control switching of headlights and taillights of the vehicle, and taillights of the trailer if connected, between on and off states.

4. The device of claim 2 wherein the lighting circuit is a high-beam headlight circuit of the vehicle, which is wired to a headlight dimmer switch of the vehicle that is manipulatable by a vehicle operator to control switching of headlights of the vehicle between high-beam and low-beam illumination states.

5. The device of claim 2 wherein the lighting circuit is a clearance/side-marker lighting circuit of the vehicle or trailer, which is wired to a clearance/side-marker control switch of the vehicle that is manipulatable by a vehicle operator to control switching of side marker and/or clearance lights of the vehicle or trailer between on and off states.

6. The device of claim 2 wherein the first lighting load comprises a rear back-up light installed on the vehicle or trailer at or proximate a rear end thereof.

7. The device of claim 2 wherein the first lighting load comprises an auxiliary work light installed on the vehicle or trailer.

8. The device of claim 7 wherein the auxiliary work light is installed at a lateral side of the vehicle or trailer.

9. The device of claim 8 wherein the auxiliary work light is installed on the trailer and is positioned thereon to illuminate load tie-down or load strapping equipment on said trailer.

10. The device of claim 2 wherein the first lighting load comprises auxiliary driving lights installed on the vehicle in forwardly-facing relation thereon.

11. A vehicle lighting control device for control of a first lighting load on a vehicle, or on a trailer towed thereby, said device comprising:

an integrated circuit (IC) chip comprising:
  a power pin connected or connectable to, in parallel relation with, a lighting circuit through which a different second lighting load on the vehicle or trailer is operated;
  a trigger pin connected or connectable with the lighting circuit in parallel relation therewith; and
  an output pin that is energized in response to dropping of a signal level at the trigger pin from a high to low state;
a solid-state switch or relay connected to the output pin of the IC chip and operable to switch into a conductive state energizing the first lighting load upon energization of said output pin of the IC chip; and
at least one capacitor connected to the power pin of the IC chip, and connected or connectable to the lighting circuit in parallel relation therewith, to accumulate stored energy during a high signal state of the lighting circuit, and to discharge said stored energy to the power pin of the IC chip when the lighting circuit drops to a low signal state.

12. The device of claim 11 in an installed condition in which the solid-state switch or relay is electrically connected to the first lighting load, and in which the trigger pin of the IC chip and said at least one capacitor are each connected to the lighting circuit.

13. A method of controlling a first lighting load on a vehicle, or on a trailer towed thereby, said method comprising:

making use of a controller that comprises:
  an integrated circuit (IC) chip having a power pin connected in parallel relation with a lighting circuit through which a different second lighting load on the vehicle or trailer is operated, a trigger pin also connected in parallel relation with the lighting circuit, and an output pin that is energized in response to dropping of a signal level at the trigger pin from a high to low state; and
  a solid-state switch or relay connected to the output pin of the IC chip and operable to switch into a conductive state energizing the first lighting load upon energization of said output pin of the IC chip;
wherein said use of the controller comprises:
monitoring said lighting circuit;
detecting a signal change sequence in said lighting circuit that comprises an initial high-to-low signal downstep, and a subsequent low-to-high signal upstep completed within a limited time window triggered by the initial high-to-low signal downstep; and
in response to detection of said signal change sequence, energizing the first lighting load.

14. The method of claim 13 comprising detecting said signal change sequence in a taillight circuit of the vehicle or trailer, as triggerable by an off-on sequence performed on a headlight control switch of the vehicle by an operator of the vehicle.

15. The method of claim 13 comprising detecting said signal change sequence in a high beam headlight circuit of the vehicle, as triggerable by a dim-bright sequence performed on a headlight dimmer switch of the vehicle by an operator of the vehicle.

16. The method of claim 13 comprising detecting said signal change sequence in a clearance/side-marker lighting circuit of the vehicle or trailer, as triggered by an off-on sequence performed on a clearance/side-marker lighting control switch of the vehicle by an operator of the vehicle.

17. The method of claim 13 wherein the first lighting load comprises a rear back-up light installed on the vehicle or trailer at or proximate a rear end thereof.

18. The method of claim 13 wherein the first lighting load comprises an auxiliary work light installed on the vehicle or trailer.

19. The method of claim 18 wherein the auxiliary work light is installed at a lateral side of the vehicle or trailer.

20. The method of claim 19 wherein the auxiliary work light is installed on the trailer and is positioned thereon to illuminate load tie-down or load strapping equipment on said trailer.

21. The method of claim 13 wherein the first lighting load comprises auxiliary driving lights installed on the vehicle in forwardly-facing relation thereon.

22. A method of controlling a first lighting load on a vehicle, or on a trailer towed thereby, said method comprising:

making use of a controller that comprises:

an integrated circuit (IC) chip having a power pin connected in parallel relation with a lighting circuit through which a different second lighting load on the vehicle or trailer is operated, a trigger pin also connected in parallel relation with the lighting circuit, and an output pin that is energized in response to dropping of a signal level at the trigger pin from a high to low state; and a solid-state switch or relay connected to the output pin of the IC chip and operable to switch into a conductive state energizing the first lighting load upon energization of said output pin of the IC chip;

wherein said use of the controller comprises:

monitoring for a particular sequence of signal changes in said lighting circuit; and in response to detected completion of said particular sequence, within a limited time duration measured from a start of said sequence, energizing the first lighting load on said vehicle or trailer;

wherein said lighting circuit is selected from among:
- a headlight/taillight circuit of the vehicle or trailer, in which the sequence of signal changes results from operator manipulation of a headlight control switch of the vehicle;
- a high-beam headlight circuit of the vehicle, in which the sequence of signal changes results from operator manipulation of a headlight dimmer switch of the vehicle; and
- a clearance/side-marker lighting circuit of the vehicle or trailer, in which the sequence of signal changes results from operator manipulation of a clearance/side-marker lighting control switch of the vehicle.

* * * * *